(12) United States Patent
Kanekar et al.

(10) Patent No.: US 8,615,654 B2
(45) Date of Patent: *Dec. 24, 2013

(54) SYSTEMS AND METHODS FOR OPTIMIZING SSL HANDSHAKE PROCESSING

(75) Inventors: Tushar Kanekar, Santa Clara, CA (US); Sivaprasad Udupa, Santa Clara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1 day.

This patent is subject to a terminal disclaimer.

(21) Appl. No.: 13/533,713

(22) Filed: Jun. 26, 2012

(65) Prior Publication Data

US 2012/0265991 A1    Oct. 18, 2012

Related U.S. Application Data

(63) Continuation of application No. 11/466,014, filed on Aug. 21, 2006, now Pat. No. 8,230,214.

(51) Int. Cl.
*H04L 29/06* (2006.01)

(52) U.S. Cl.
USPC ........... 713/156; 713/152; 713/153; 713/154; 713/155

(58) Field of Classification Search
USPC .................................................. 713/152–156
See application file for complete search history.

(56) References Cited

U.S. PATENT DOCUMENTS

| | | | |
|---|---|---|---|
| 6,367,009 B1 * | 4/2002 | Davis et al. | 713/152 |
| 7,254,237 B1 | 8/2007 | Jacobson et al. | |
| 7,584,500 B2 | 9/2009 | Dillon et al. | |
| 2003/0014623 A1 | 1/2003 | Freed et al. | |
| 2003/0014628 A1 | 1/2003 | Freed et al. | |
| 2003/0097592 A1 | 5/2003 | Adusumilli | |
| 2005/0050362 A1 | 3/2005 | Peles | |
| 2005/0065678 A1 | 3/2005 | Smith et al. | |
| 2005/0108517 A1 | 5/2005 | Dillon et al. | |

FOREIGN PATENT DOCUMENTS

WO    WO-02/27552 A2    4/2002

OTHER PUBLICATIONS

Notice of Allowance on U.S. Appl. No. 11/466,014 dated Mar. 28, 2012.
Office Action on U.S. Appl. No. 11/466,014 dated Oct. 25, 2011.
Office Action on U.S. Appl. No. 11/466,014 dated Feb. 2, 2010.
Office Action on U.S. Appl. No. 11/466,014 dated Jul. 29, 2009.

\* cited by examiner

*Primary Examiner* — Brandon Hoffman
*Assistant Examiner* — Thong Truong
(74) *Attorney, Agent, or Firm* — Foley & Lardner LLP; Christopher J. McKenna

(57) ABSTRACT

A method for enabling efficient SSL handshakes through pre-computing of handshake messages, the method includes: receiving, by an appliance, a server certificate identifying a server; generating, by the appliance, at least one of: (i) an SSL server certificate message comprising the received server certificate, (ii) an SSL client certificate request message, and (iii) an SSL hello done message; storing, by the appliance, the generated messages; receiving, by the appliance from a client, an SSL client hello message identifying the server; and transmitting, by the appliance to the client, an SSL server hello message and at least one of the stored messages. Corresponding systems are also described.

20 Claims, 13 Drawing Sheets

SYSTEMS AND METHODS FOR OPTIMIZING SSL HANDSHAKE PROCESSING

RELATED APPLICATION

This present application claims priority to and is a continuation of U.S. patent application Ser. No. 11/466,014, entitled "SYSTEMS AND METHODS FOR OPTIMIZING SSL HANDSHAKE PROCESSING", filed Aug. 21, 2006, which is incorporated herein by reference in its entirety for all purposes.

FIELD OF THE DISCLOSURE

The present invention relates to computer networking technologies, and more specifically, to systems and methods for improving the efficiency of secure communication initialization.

BACKGROUND OF THE DISCLOSURE

Many networking applications require secure and authenticated communications. SSL and its related protocols are often used to enable secure communications between a client and a server. One drawback of SSL is that the handshake required to initiate an SSL connection may require significant computing resources, slowing down client access. One solution to this problem is to offload the task of SSL processing to a network appliance, which may sit in front of a server on a network and handle SSL connection requests. The appliance may then transmit data received via the SSL communications to the server either via a nonsecure channel or via a single SSL connection using connection pooling techniques.

However, this solution may not be adequate for all networks. Computing SSL handshake messages may be a processor intensive task, and thus reduce the number of appliance processor cycles available for other tasks, such as servicing existing connections, load balancing, and caching. Thus there exists a need for systems and methods which accelerate the generation and processing of SSL handshake messages on a network appliance.

SUMMARY OF THE DISCLOSURE

In one aspect, the present invention relates to a method for buffering SSL handshake messages prior to computing a message digest for the SSL handshake, the method comprising: conducting, by an appliance with a client, an SSL handshake, the SSL handshake comprising a plurality of SSL handshake messages; storing, by the appliance, the plurality of SSL handshake messages; providing, by the appliance to a message digest computing device in response to receiving a client finish message corresponding to the SSL handshake, the plurality of SSL handshake messages; receiving, by the appliance from the message digest computing device, a message digest corresponding to the provided messages; determining by the appliance, the message digest matches a message digest included in the SSL client finish message; and completing, by the appliance with the client, the SSL handshake.

In a second aspect, the present invention relates to a computer implemented system for buffering SSL handshake messages prior to computing a message digest for the SSL handshake, the system comprising: a network appliance which conducts, with a client, an SSL handshake, the SSL handshake comprising a plurality of SSL handshake messages; storing, by the appliance, the plurality of SSL handshake messages; providing, to a message digest computing device in response to receiving a client finish message corresponding to the SSL handshake, the plurality of SSL handshake messages; receiving, from the message digest computing device, a message digest corresponding to the provided messages; determining, the message digest matches a message digest included in the SSL client finish message; and completing, with the client, the SSL handshake; and a message digest computing device which computes a message digest corresponding to one or more received messages.

In a third aspect, the present invention relates to a method for enabling efficient SSL handshakes through precomputing of handshake messages, the method comprising: receiving, by an appliance, a server certificate identifying a server; generating, by the appliance, at least one of: (i) an SSL server certificate message comprising the received server certificate, (ii) an SSL client certificate request message, and (iii) an SSL hello done message; storing, by the appliance, the generated messages; receiving, by the appliance from a client, an SSL client hello message identifying the server; and transmitting, by the appliance to the client, an SSL server hello message and at least one of the stored messages.

In a fourth aspect, the present invention relates to a computer implemented system for enabling efficient SSL handshakes through precomputing of handshake messages, the system comprising: a network appliance which receives a server certificate identifying a server; generates at least one of: (i) an SSL server certificate message comprising the received server certificate, (ii) an SSL client certificate request message, and (iii) an SSL hello done message; stores the generated messages; receives, from a client, an SSL client hello message identifying the server; and transmits, to the client, an SSL server hello message and at least one of the stored messages.

In a fifth aspect, the present invention relates to a method for using a network appliance to efficiently buffer and encrypt data for transmission, the method comprising: receiving, by an appliance via a connection, a first SSL record, the first record comprising a first encrypted message; decrypting, by the appliance, the first encrypted message to produce a first decrypted message; buffering, by the appliance, the first decrypted message; receiving, by the appliance via the connection, a second SSL record, the second record comprising a second encrypted message; decrypting, by the appliance, the second encrypted message to produce a second decrypted message; determining, by the appliance, that a transmittal condition has been satisfied; encrypting, by the appliance in response to the determination, the first decrypted message and a portion of the second decrypted message to produce a third SSL record; and transmitting, by the appliance via a second connection, the third record.

In a sixth aspect the present invention relates to a computer implemented system for efficiently buffering and encrypting data for transmission, the system comprising: a network appliance which receives, via a connection, a first SSL record, the first record comprising a first encrypted message; decrypts the first encrypted message to produce a first decrypted message; buffers the first decrypted message; receives, via the connection, a second SSL record, the second record comprising a second encrypted message; decrypts the second encrypted message to produce a second decrypted message; determines that a transmittal condition has been satisfied; encrypts, in response to the determination, the first decrypted message and a portion of the second decrypted message to produce a third SSL record; and transmits, via a second connection, the third record.

BRIEF DESCRIPTION OF THE FIGURES

The foregoing and other objects, aspects, features, and advantages of the invention will become more apparent and better understood by referring to the following description taken in conjunction with the accompanying drawings, in which.

DETAILED DESCRIPTION

A. Network and Computing Environment

Figure 1A:
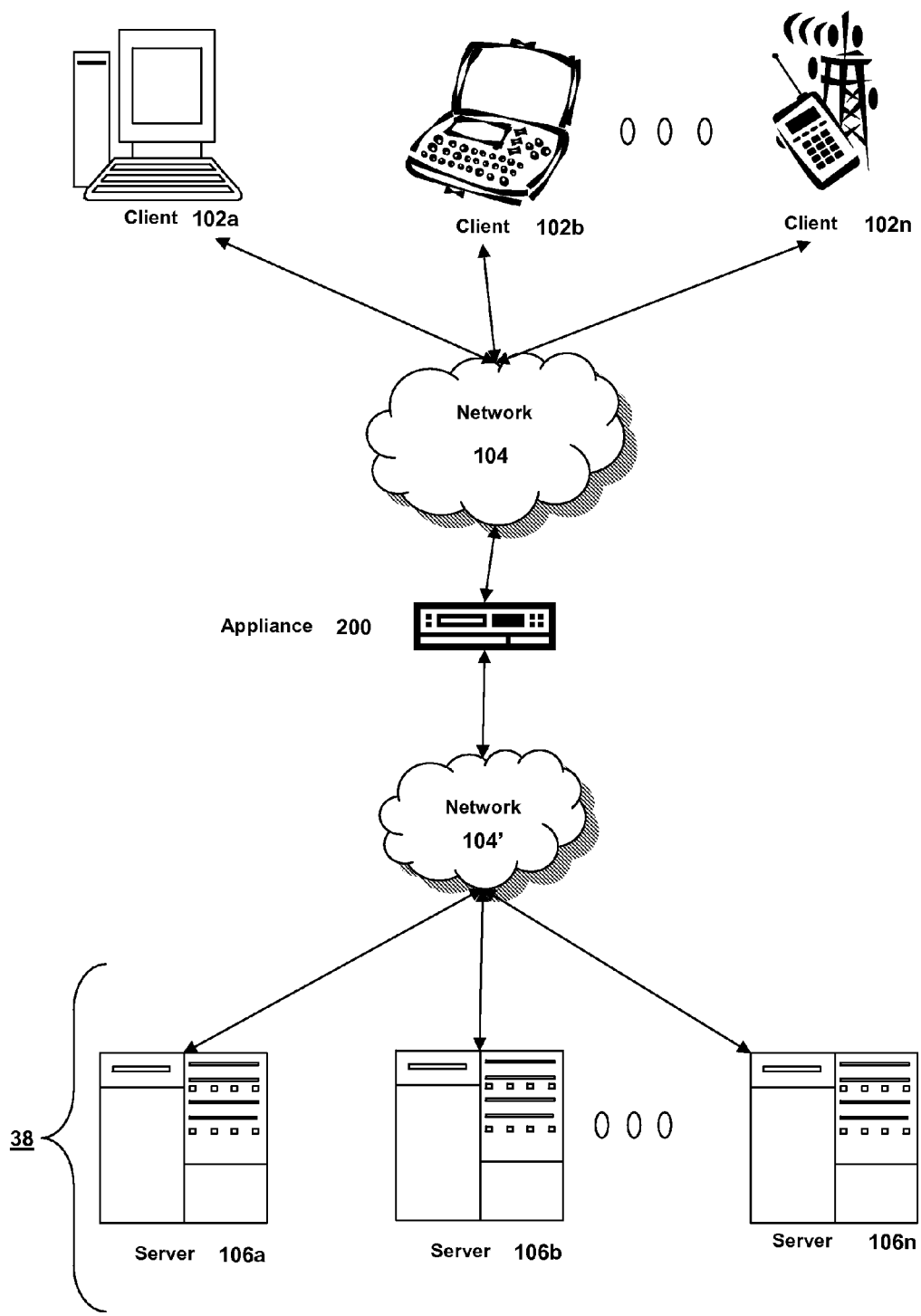
FIG. 1A is a block diagram of an embodiment of a network environment for a client to access a server via an appliance.

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 10b and responds to the request by the client 102 with a response to the request from the server 10b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
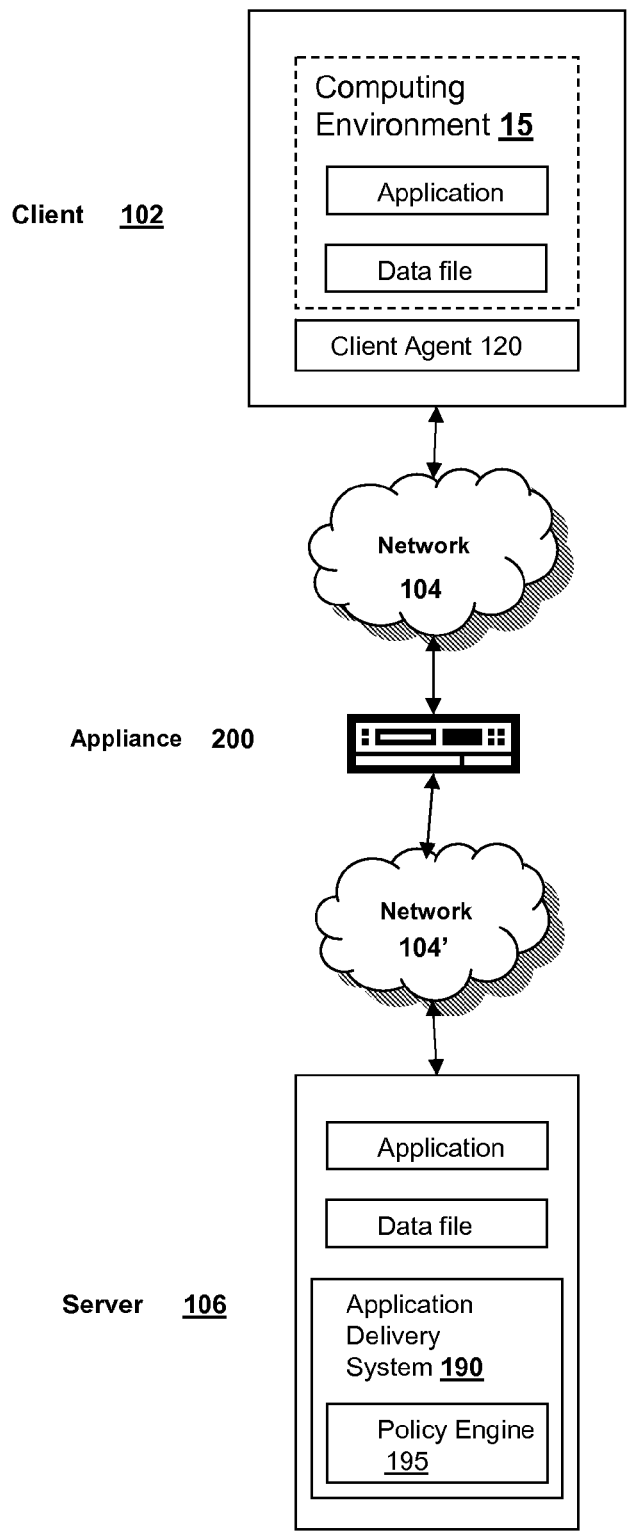
FIG. 1B is a block diagram of an embodiment of an environment for delivering a computing environment from a server to a client via an appliance.

Referring now to FIG. 1B, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Figure 1C:
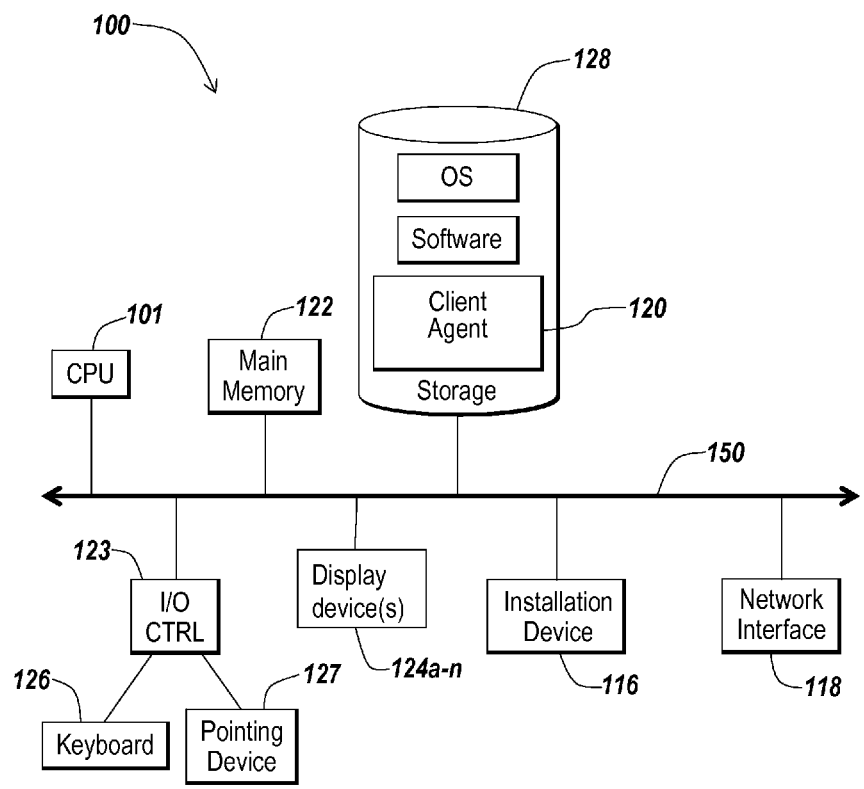
FIGS. 1C and 1D are block diagrams of embodiments of a computing device.
Figure 1D:
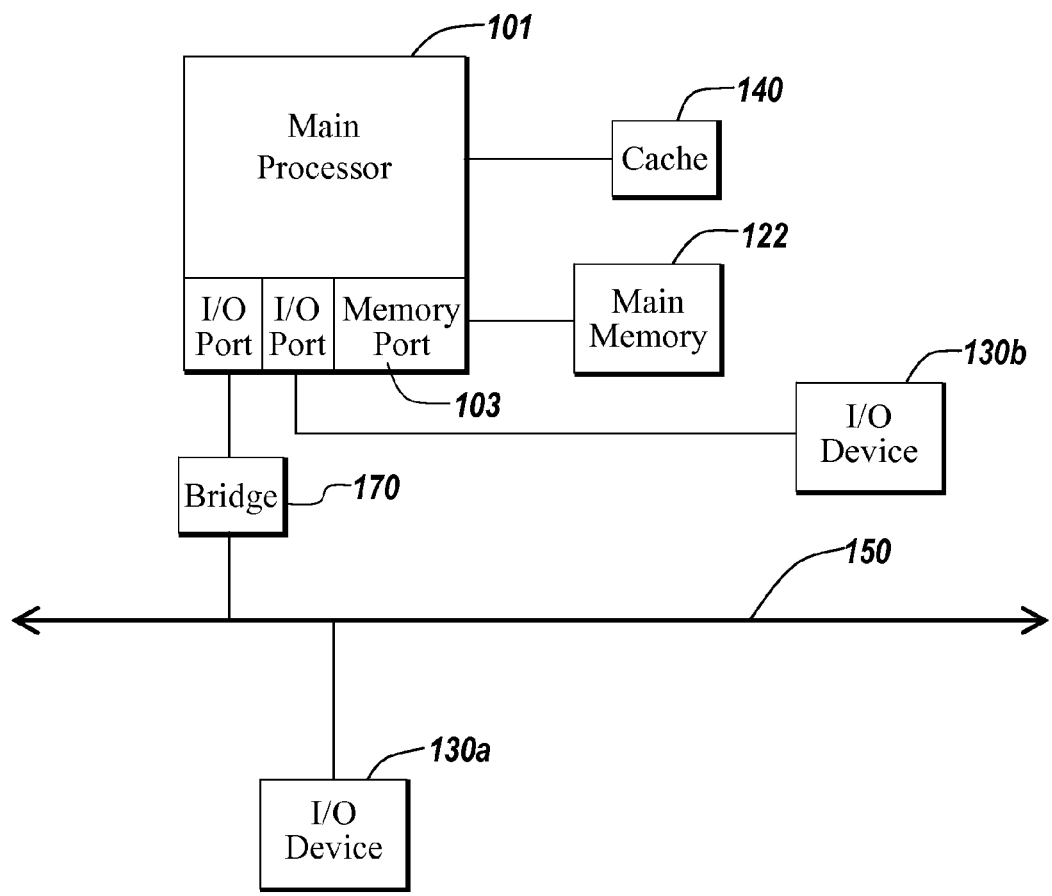

The client 102, server 106, and appliance 200 may be deployed as and/or executed on any type and form of computing device, such as a computer, network device or appliance capable of communicating on any type and form of network and performing the operations described herein. FIGS. 1C and 1D depict block diagrams of a computing device 100 useful for practicing an embodiment of the client 102, server 106 or appliance 200. As shown in FIGS. 1C and 1D, each computing device 100 includes a central processing unit 101, and a main memory unit 122. As shown in FIG. 1C, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1C, the processor 101 communicates with main memory 122 via a system bus 150 (described in more detail below). FIG. 1C depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1C, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1D depicts an embodiment of a computer 100 in which the main processor 101 communicates directly with I/O device 130 via HyperTransport, Rapid I/O, or InfiniBand. FIG. 1D also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1C. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1C and 1D typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

B. Appliance Architecture

Figure 2A:
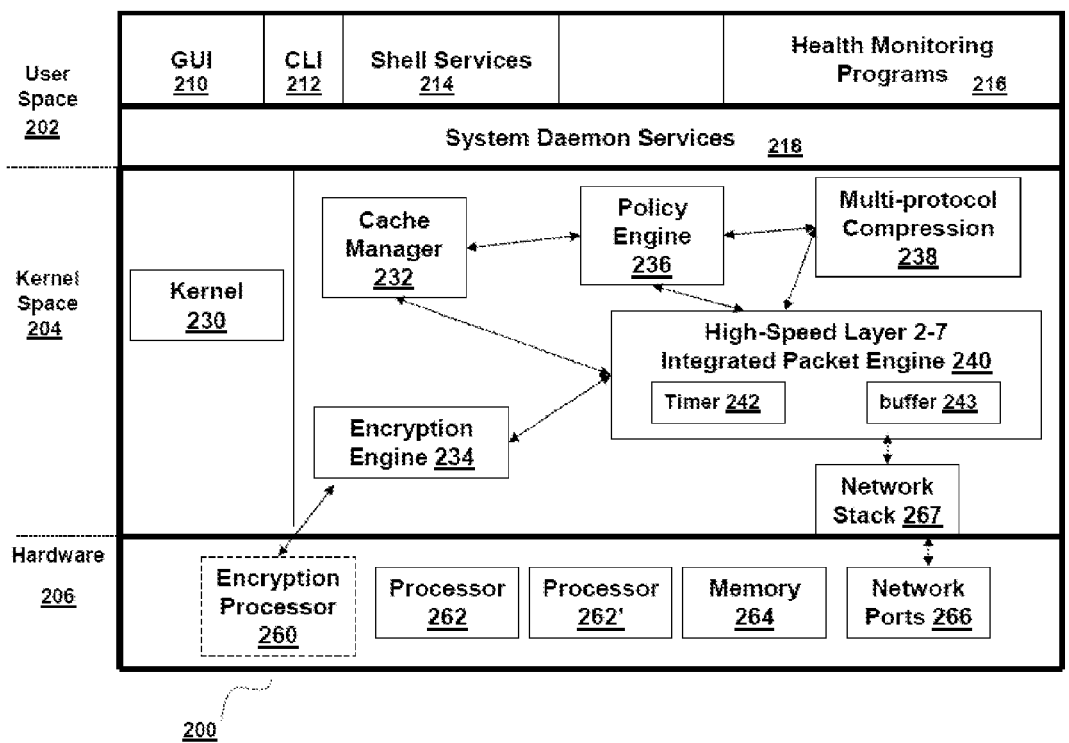
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1C and 1D. In some embodiments, the central processing unit 262 may perform the functions of the encryption processor 260 in a single processor. Additionally, the hardware layer 206 may comprise multiple processors for each of the processing unit 262 and the encryption processor 260. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may be have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1C and 1D. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232. sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element nat comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identifying, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of HyperText Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packer. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200 and either is user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
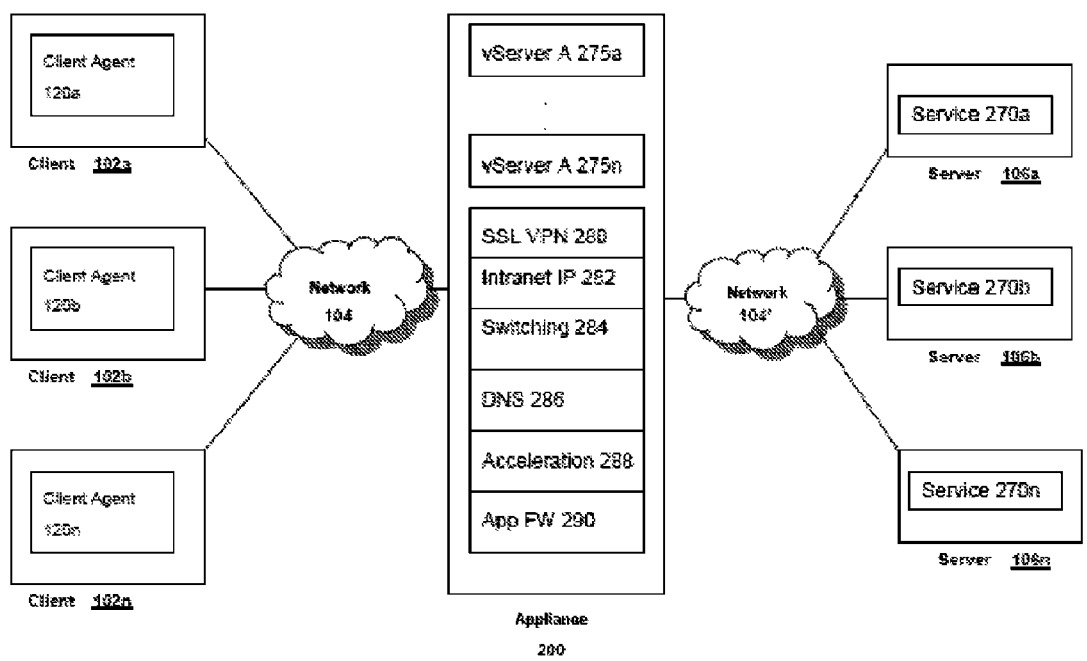
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. In one embodiment, the appliance 200 comprises any of the network devices manufactured by Citrix Systems, Inc. of Ft. Lauderdale Fla., referred to as Citrix NetScaler devices. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a VServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 103 In one embodiment, the appliance 102 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of tranport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or intranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP, which is network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching.

In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts' a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

C. Client Agent

Figure 3:
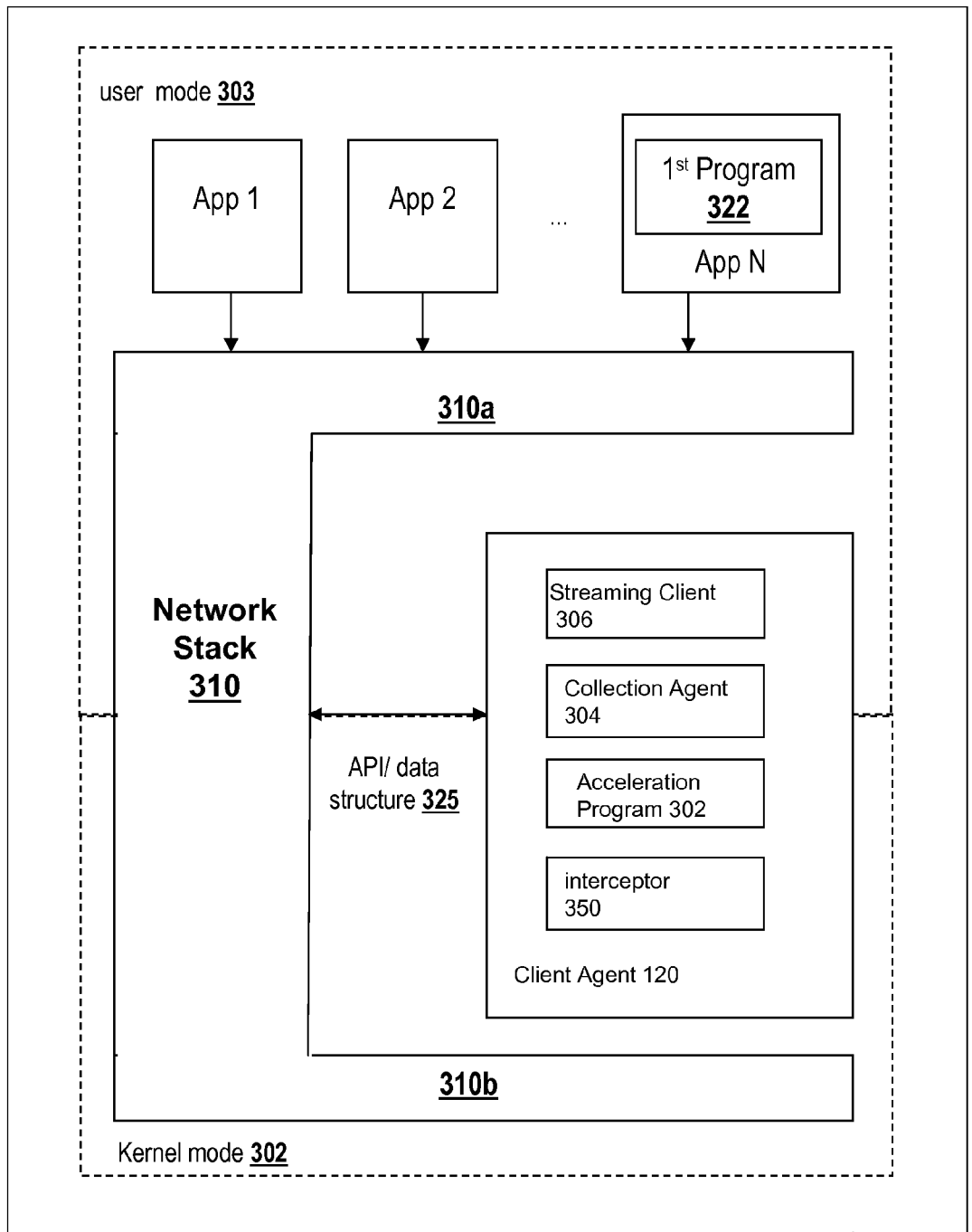
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 120 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310a of the network stack may provide user-mode access to the network stack 310 to an application while a second portion 310a of the network stack 310 provides access to a network. In some embodiments, a first portion 310a of the network stack may comprise one or more upper layers of the network stack 310, such as any of layers 5-7. In other embodiments, a second portion 310b of the network stack 310 comprises one or more lower layers, such as any of layers 1-4. Each of the first portion 310a and second portion 310b of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a min-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, and/or a collection agent 304. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as payload of network packet of the transport layer protocol The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

D. Efficient SSL Handshake Processing

Figure 4A:
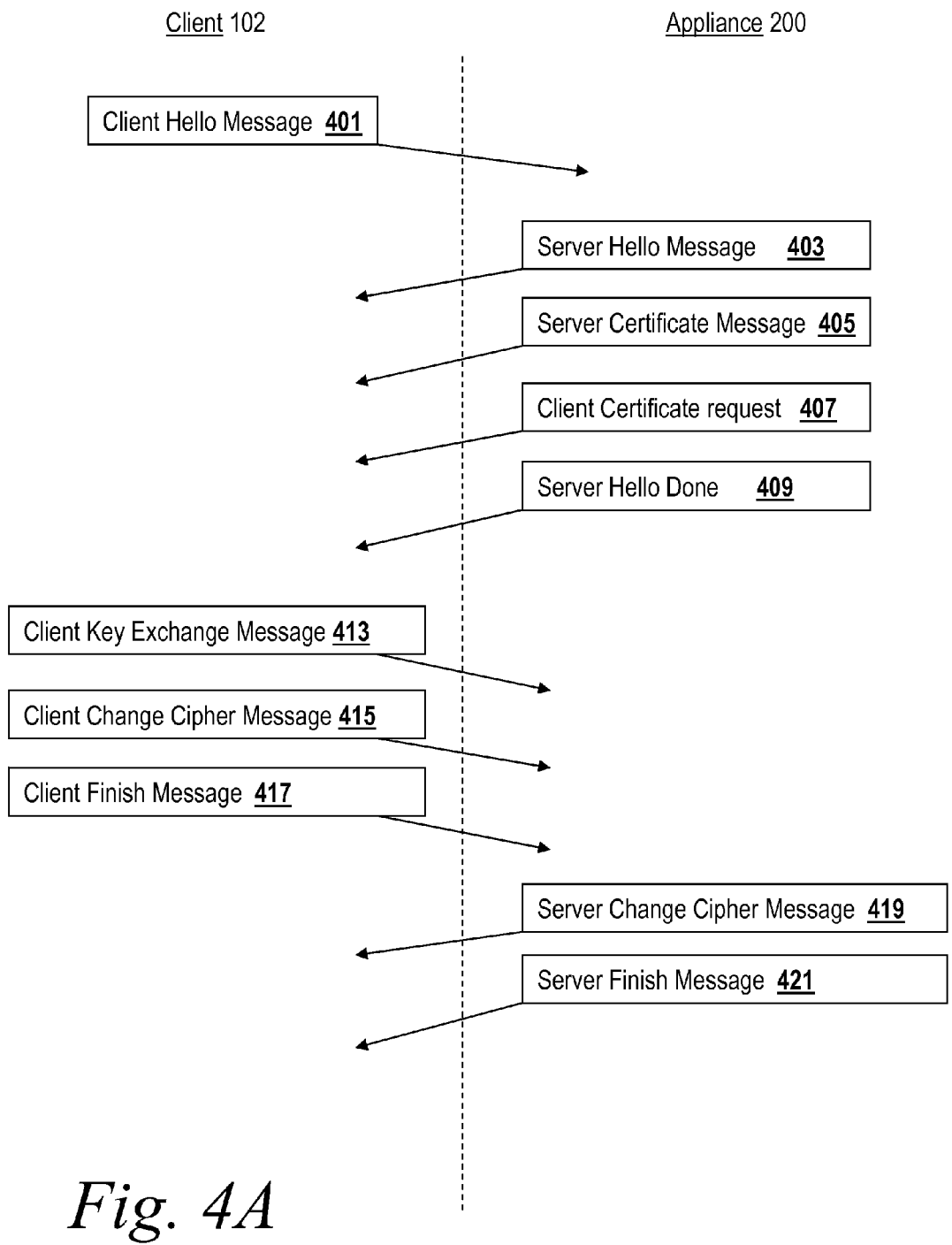
FIG. 4A is a flow diagram of an example SSL handshake.

Referring now to FIG. 4A, a flow diagram of an example SSL handshake is shown. In brief overview, a client 102 transmits a client hello message 401. An appliance 200 may then respond with a server hello 403, server certificate 405, client certificate request 407, and server hello done messages 409. The client may then respond with a client key exchange message 413, a client change cipher message 415, and a client finish message 417. The appliance 200 may then respond with a server change cipher message 419, and a server finish message 421. In some SSL handshakes, in response to the server's Certificate Request message, the client may send a Client Certificate message followed by a client key exchange message 413, a client-certificate-verify message, a client-change-cipher message 415 and a client finish message 417.

Still referring to FIG. 4A, now in greater detail, a client 102 and an appliance 200 engage in an SSL handshake. An SSL handshake may be performed according to any version of SSL including without limitation SSLv2 and SSLv3.0. An SSL handshake may also be performed according to any related secure communication standards including without limitation TLS 1.0 as defined in RFC 2246 and TLS 1.1 as defined in RFC 4346. Additional published documents describing related protocols and extensions to SSL and TLS which may be used in conjunction with the methods described below include without limitation RFC 2712, RFC 2817, RFC 2818, RFC 3268, RFC 3546, RFC 4132, RFC 4162, RFC 4279, RFC 4347, RFC 4366, and RFC 4492.

In one embodiments, an appliance may initiate perform an SSL handshake as a client. For example, an appliance may initiate an SSL connection with a server, or with a second appliance. In this embodiment, the appliance may send the client hello message 401, client certificate message 411, a client key exchange message 413, a client change cipher message 415, and a client finish message 417. In this embodiment, the appliance may also send a client certificate message followed by a client key exchange message 413, a client-certificate-verify message, a client-change-cipher message 415 and a client finish message 417.

In another embodiment, an abbreviated SSL handshake may be used to resume a previous session. In another embodiment, an SSL handshake may also include server verification of a client, such as via transmission from the client to the server of a client certificate and a client certificate verify message.

An SSL handshake may require a message digest be computed of all the messages exchanged in order to verify that an SSL server and SSL client have received the same messages, and no errors or attacks have been introduced into the transmissions. To perform the verification, a client may first compute a message digest of all the messages the SSL client has sent and received comprising the handshake, and then transmit the result to the SSL server via a client finish message 417. The SSL server may then compute the message digest of all messages the SSL server has sent and received in order to verify that the two message digests are the same. The SSL client and SSL server may compute the message digest usage digest algorithm agreed upon during the course of the handshake. Examples of message digest algorithms may include without limitation MD4; MD5; CRC-32; MD5; RIPEMD-160; SHA; and HAVAL.

Figure 4B:
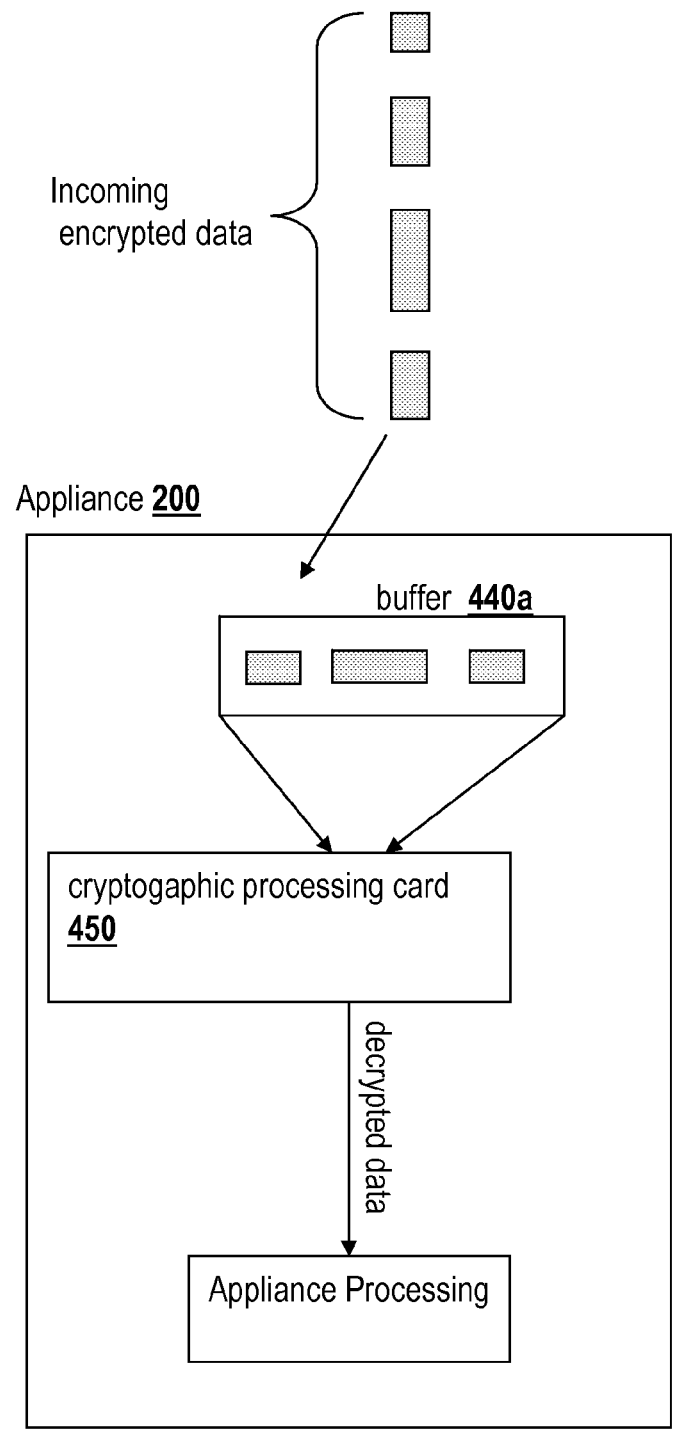
FIG. 4B is, a flow diagram of an appliance utilizing bulk decryption.

Referring now to FIG. 4B, a flow diagram of an appliance utilizing bulk decryption is shown. In brief overview, an appliance 200 receives a plurality of encrypted data packets. The appliance buffers a plurality of the data packets in one or more buffers 440a. The appliance may then provide a plurality of buffered data packets to an cryptographic processing card 450 for decryption. The appliance may then process the decrypted data.

Still referring to FIG. 4B, now in greater detail, an appliance 200 receives a plurality of encrypted data packets. The encrypted packets may be received from any computing device, including a client 102, server 106, or a second appliance 200.

The encrypted packets may be encrypted using any encryption algorithm, including without limitation RSA, DES, DESS, AES, Blowfish, IDEA, SEAL, and RC4. The packets may comprise any protocol described herein. In some embodiments, the encrypted data may comprise one or more SSL records. In some embodiments the encrypted packets may be received from a plurality of sources. In some embodiments, the encrypted packets may be received from a plurality of connections.

The received encrypted packets may then be buffered in one or more buffers 440a. In some embodiments, the buffers 440a may be a fixed size. In other embodiments, the buffers 440b may be a variable size. In some embodiments, a given buffer may be assigned to a given connection. In other embodiments, a buffer may receive data from a plurality of connections.

The received encrypted packets may be buffered until a complete SSL record has been received. An SSL record may comprise a header, data, a message authentication code, and any necessary padding. The SSL header may comprise a type field, a version field, and a length field. In some cases, portions of a single SSL record may be encapsulated in a plurality of packets. In other cases, a single packet may comprise portions of a plurality of SSL records.

Upon receipt of a complete SSL record, the buffer may provide the SSL record to the cryptographic processing card 450. A cryptographic processing card may comprise any hardware specifically designed or adapted to compute cryptographic functions such as message digests, including without limitation the OCTEON and NITROX lines of security processors and acceleration boards manufactured by Cavium Networks, and the BCM1600, BCM4000, BCM5820 and other security and SSL processors manufactured by Broadcom Corporation. In some embodiments, an appliance may comprise a plurality of dedicated cryptographic processing cards.

In some embodiments, the SSL record may be passed to the cryptographic processing card 450. In other embodiments, the lengths and locations of the SSL record within the buffer may be provided to the card. In some cases, portions of a single SSL record may be stored in more than one buffer. In these cases, the locations of the SSL record within the more than one buffers may be provided to the card.

In some embodiments, the cryptographic processing card 450 may decrypt an SSL record in-place, writing over the encrypted data with the decrypted data. In this manner, the same buffer or buffers is used to hold the decrypted data as was used to hold the encrypted data. In other embodiments, the cryptographic processing card 450 may decrypt an SSL record and store the decrypted data in a different buffer or memory element. The appliance may then process the decrypted data in accordance with performing any of the appliance functions described herein.

Figure 4C:
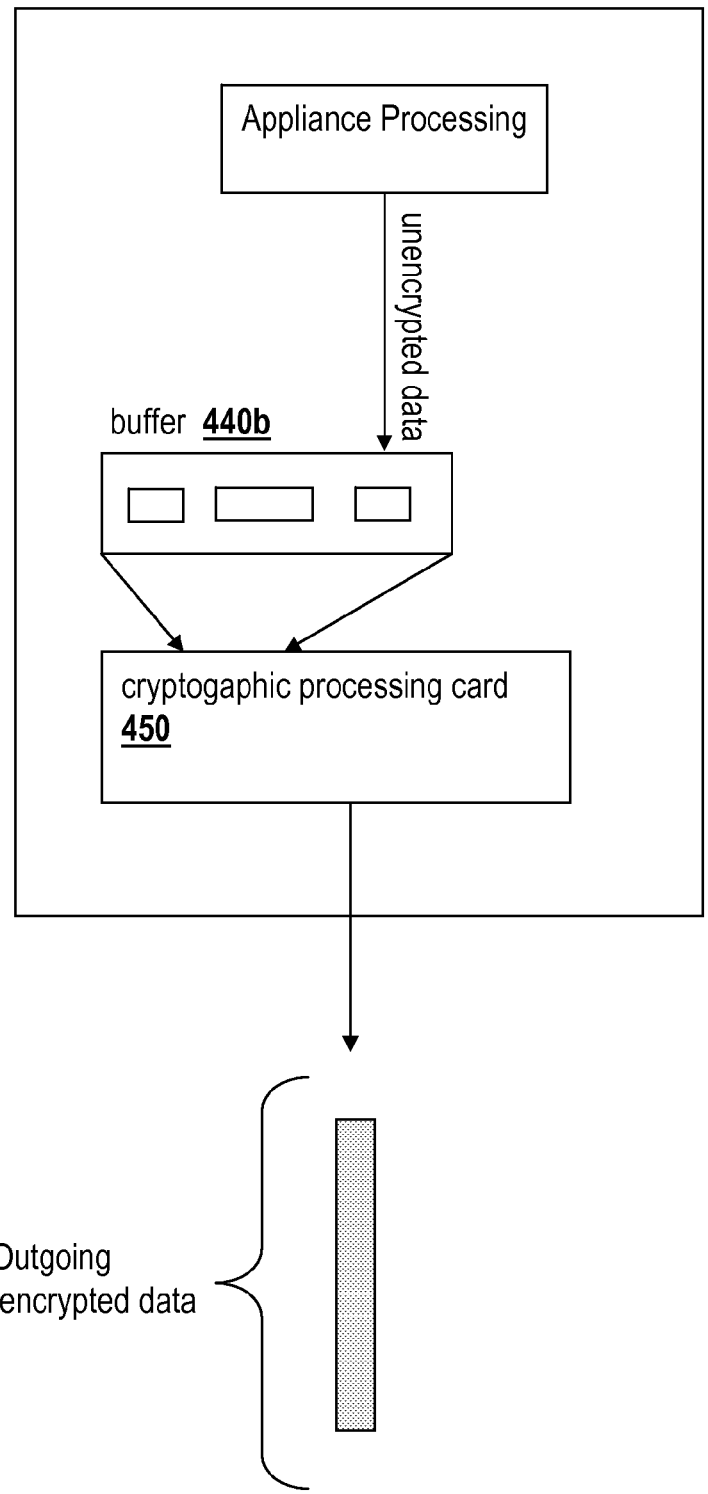
FIG. 4C is a flow diagram of an appliance providing bulk encryption.

Referring now to FIG. 4C, a flow diagram of an appliance providing bulk encryption is shown. In brief overview, unencrypted data that has been processed or received by the appliance is buffered prior to transmission. Upon the occurrence of a transmission condition, the buffered data is provided to a cryptographic processing card 450 for encryption. The encrypted data is then transmitted.

Still referring to FIG. 4C, now in greater detail, unencrypted data that has been processed or received by the appliance is buffered prior to transmission. In some embodiments, the unencrypted data may comprise unencrypted data previously received by the appliance. In other embodiments, the unencrypted data may comprise encrypted data previously received by the appliance and subsequently decrypted. In one embodiment, the unencrypted data may comprise encrypted data previously received by the appliance and subsequently decrypted by the appliance using a bulk decryption method as described herein.

The unencrypted data may be stored in one or more buffers 440b until a transmission condition is met. Transmission conditions, which in be discussed in greater detail in conjunction with FIG. 7, may include any of the following (i) a given quantum size of unencrypted data being received in the buffer, (ii) an end-of-transaction message in the unencrypted data, (iii) a FIN message in the unencrypted data, (iv) a TCP PUSH message in the unencrypted data, and (v) a timer expiring.

After the occurrence of a transmission condition, the buffered unencrypted data is passed to a cryptographic processing card 450 for encryption. The encryption process may utilize any encryption algorithm. In one embodiment, a single SSL record will be created from the encrypted data. The encrypted data is then transmitted.

Figure 5:
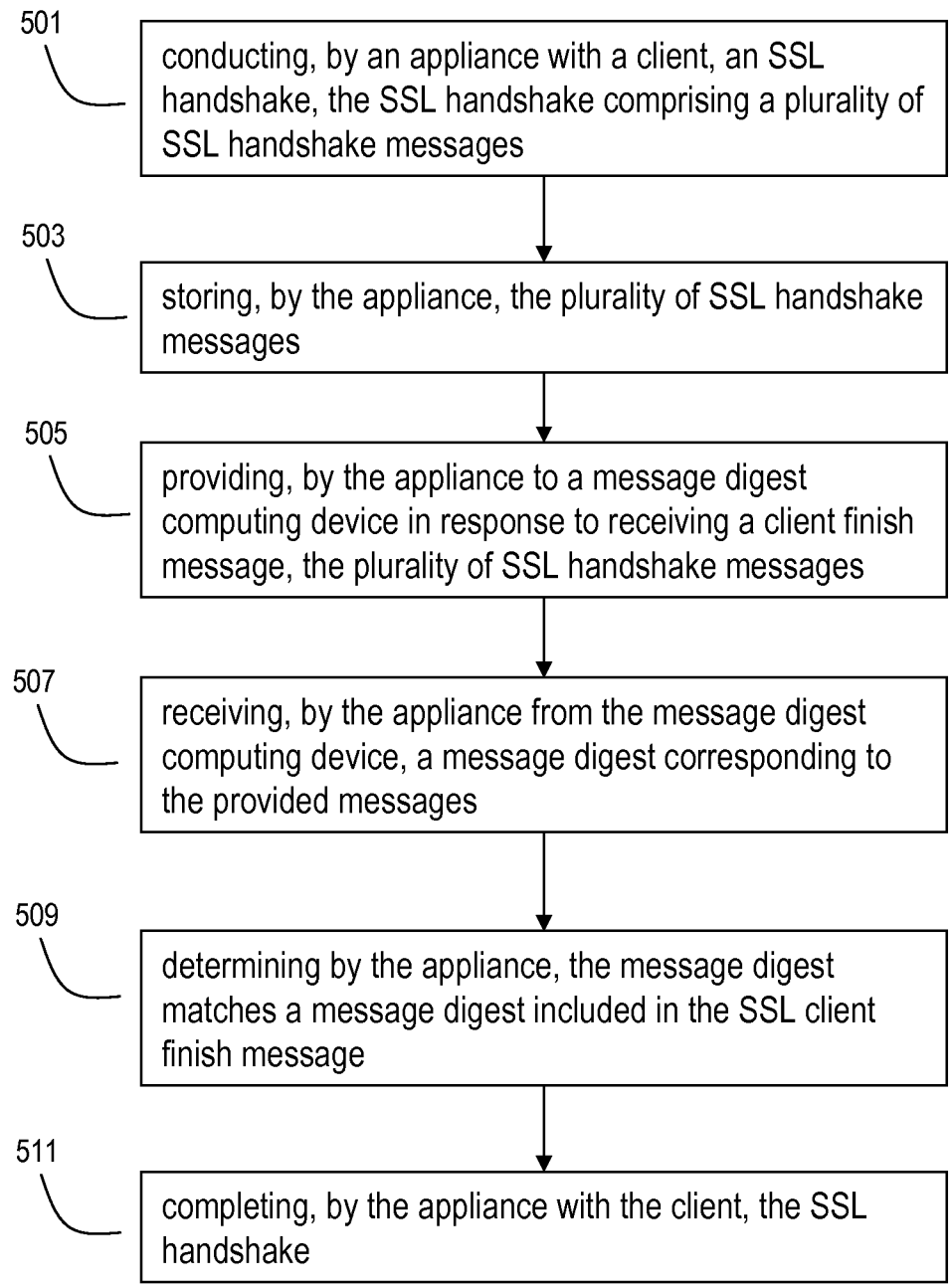
FIG. 5 is a flow diagram of a method for buffering SSL handshake messages prior to computing a message digest for the SSL handshake.

Referring now to FIG. 5, a flow diagram of a method for buffering SSL handshake messages prior to efficiently computing a message digest for the SSL handshake is shown. In brief overview, the method comprises: conducting, by an appliance with a client, an SSL handshake, the SSL handshake comprising a plurality of SSL handshake messages (step 501); storing, by the appliance, the plurality of SSL handshake messages (step 503); providing, by the appliance to a message digest computing device in response to receiving a client finish message, the plurality of SSL handshake messages (step 505); receiving, by the appliance from the message digest computing device, a message digest corresponding to the provided messages (step 507); determining by the appliance, the message digest matches a message digest included in the SSL client finish message (step 509); and completing, by the appliance with the client, the SSL handshake (step 511).

Still referring to FIG. 5, now in greater detail, a method for buffering SSL handshake messages prior to computing a message digest for the SSL handshake comprises: conducting, by an appliance 200 with a client, an SSL handshake, the SSL handshake comprising a plurality of SSL handshake messages (step 501). The appliance 200 may conduct the SSL handshake using any of the SSL, TLS, and related protocols described herein. In some embodiments, the appliance 200 may initiate the SSL handshake. In other embodiments, the appliance 200 may receive a handshake initiation request. The plurality of SSL handshake messages may comprise any of the SSL handshake messages described. In some embodiments, the SSL handshake may comprise a session re-use or resume handshake. In some embodiments, the plurality of SSL handshake messages may comprise a subset of the messages comprising the conducted SSL handshake.

An appliance may then store the plurality of SSL handshake messages (step 503). In some embodiments, the appliance 200 may store all messages comprising the SSL handshake record, including at least one of: a client hello message, a server hello message, and a client key exchange message, a client certificate message, a client certificate verify message, a server certificate message and a client certificate request message, and a server hello done message.

In some embodiments, the appliance 200 the stored plurality of SSL handshake messages may comprise a subset of the SSL handshake messages comprising the handshake record. In one embodiment, the appliance may store only received messages and those sent messages which cannot be regenerated by the appliance. An example of a sent message which may not be able to be regenerated may be the server hello message, which includes a random component comprising the session identifier. For example, in an embodiment where the appliance 200 is acting as the SSL server, the appliance 200 may store the client hello, server hello, and client key exchange messages. The appliance may then regenerate the server certificate, server hello done, and client certificate request messages for purposes of computing the message digest.

In some embodiments, the appliance may store only a portion of a message, and then regenerate the rest of the message when computing the message digest. For example, in an embodiment where the appliance 200 is acting as the SSL client, the appliance may store the random component of a sent client hello message in a data structure comprising other information about the SSL connection request such as the server address, and then regenerate the client hello message using the stored portion and the other information for purposes of computing the message digest.

In some embodiments, the appliance may store the plurality of messages in a separate buffer corresponding to the SSL handshake. In another embodiment, the appliance may store the plurality of messages in the buffers in which the messages were received or sent. In this embodiments, the appliance 200 may maintain a data structure indicating the lengths and locations of the messages. In some embodiments, some of the plurality of messages may be stored in memory dedicated to precomputed handshake messages, as will be discussed in conjunction with FIG. 6.

After storing the plurality of SSL handshake messages (step 503), the appliance may provide, by the appliance to a message digest computing device in response to receiving a client finish message, the plurality of SSL handshake messages (step 505). A message digest computing device may comprise any processor, card, or circuitry, or other hardware capable of computing a message digest. In one embodiment, a message digest computing device may comprise a general purpose microprocessor. In some embodiments, the message digest computing device may be located within the physical appliance 200. In other embodiments, the message digest computing device may be a separate standalone device.

In one embodiment, the message digest computing device may comprise a dedicated cryptographic processing card 450 located within the appliance. In some embodiments, an appliance may comprise a plurality of dedicated cryptographic processing cards. In one embodiment the appliance may determine which of a plurality of dedicated cryptographic processing cards 450 to provide the SSL handshake messages to based on one or more load balancing factors, including without limitation availability, capacity, latency, and current usage.

In some embodiments, the appliance may pass the plurality of SSL handshake messages to the message digest computing device. In other embodiments, the appliance may pass the lengths and locations of the messages to the message digest computing device. The appliance may also specify the algorithm to be used by the message digest computing device to compute the message digest.

In some embodiments, the appliance may provide additional messages along with the stored plurality of SSL handshake messages to be included in the message digest computation. In embodiments where only a subset of the SSL handshake messages were stored, the appliance may regenerate the SSL handshake messages not stored, and provide the regenerated messages along with the stored plurality of messages to the message digest computing device. For example, in an embodiment where the appliance 200 is acting as the SSL server, the appliance 200 may store the client hello, server certificate, server hello done, and client key exchange messages corresponding to a given SSL handshake, and store portions of the server hello message. Upon receiving the client finish message, the appliance may then regenerate the server hello message. The appliance may then provide the message digest computing device with the lengths and locations of the client hello, server hello, and, server certificate, server hello done, and client key exchange messages, and client certificate request messages. The message digest computer may then compute a single message digest corresponding to all of the SSL handshake messages.

After providing, by the appliance to a message digest computing device in response to receiving a client finish message, the plurality of SSL handshake messages (step 505); the appliance may receive, from the message digest computing device, a message digest corresponding to the provided messages (step 507). In some embodiments, the message digest computing device may pass the message digest to the appliance. In other embodiments, the message digest computing device may provide the appliance with a location where the message digest is stored in memory.

After receiving, from the message digest computing device, a message digest corresponding to the provided messages (step 507); the appliance may then determine the message digest matches a message digest included in the SSL client finish message (step 509). In the event the message digest does not match a message digest included in the SSL client finish message, the appliance may follow any SSL protocol or take any action corresponding to a potentially corrupted or failed handshake, including without limitation transmitting a handshake failure message, restarting the handshake, or disconnecting from the client.

After determining by the appliance, the message digest matches a message digest included in the SSL client finish message (step 509); the appliance may complete, with the client, the SSL handshake (step 511). The SSL handshake may be completed according to any SSL protocol, including without limitation the transmission of an SSL server finish message. After completion of the SSL handshake, the appliance and the client may then begin transmitting data via the established SSL channel.

In some embodiments, the above method may be used to maximize available appliance CPU time. For example, the method may require less CPU cycles than an alternative method of progressively updating the message digest for the SSL handshake each time an SSL handshake messages is received or sent.

In other embodiments, the above method may be utilized to maximize throughput for a message digest computing device. For example, an appliance may have a dedicated cryptographic processing card with a given capacity for computing message digests. By storing the SSL handshake messages and computing the message digest only at the end of the handshake, an appliance may be able to access the card fewer times, while still handling the same number of transactions. In some embodiments, accessing the card fewer times may result in increased number of SSL handshakes that can be processed over a given interval. In other embodiments, accessing the card fewer times may free the card to perform cryptographic operations for other appliance functions, such as encrypting or decrypting messages.

In some embodiments, this method may allow an appliance to reach and optimize the maximum number of operations per second of a given dedicated cryptographic processing card. For example, if a given card has a maximum throughput of 8000, 12,000, or 20,000 cryptographic operations per second, using the described method may result in more SSL handshakes being completed per second, as opposed to the method wherein the message digest is computed serially, and the card must be accessed multiple times to compute message digests during the course of an SSL handshake.

In some embodiments, the above method may allow an appliance to handle increased SSL transactions per second. The above method may result in performance gains of 5%, 10%, 15%, 20%, 25%, 30% or more when used in comparison to an appliance with identical hardware computing SSL handshake message digests in a serial manner.

Figure 6:
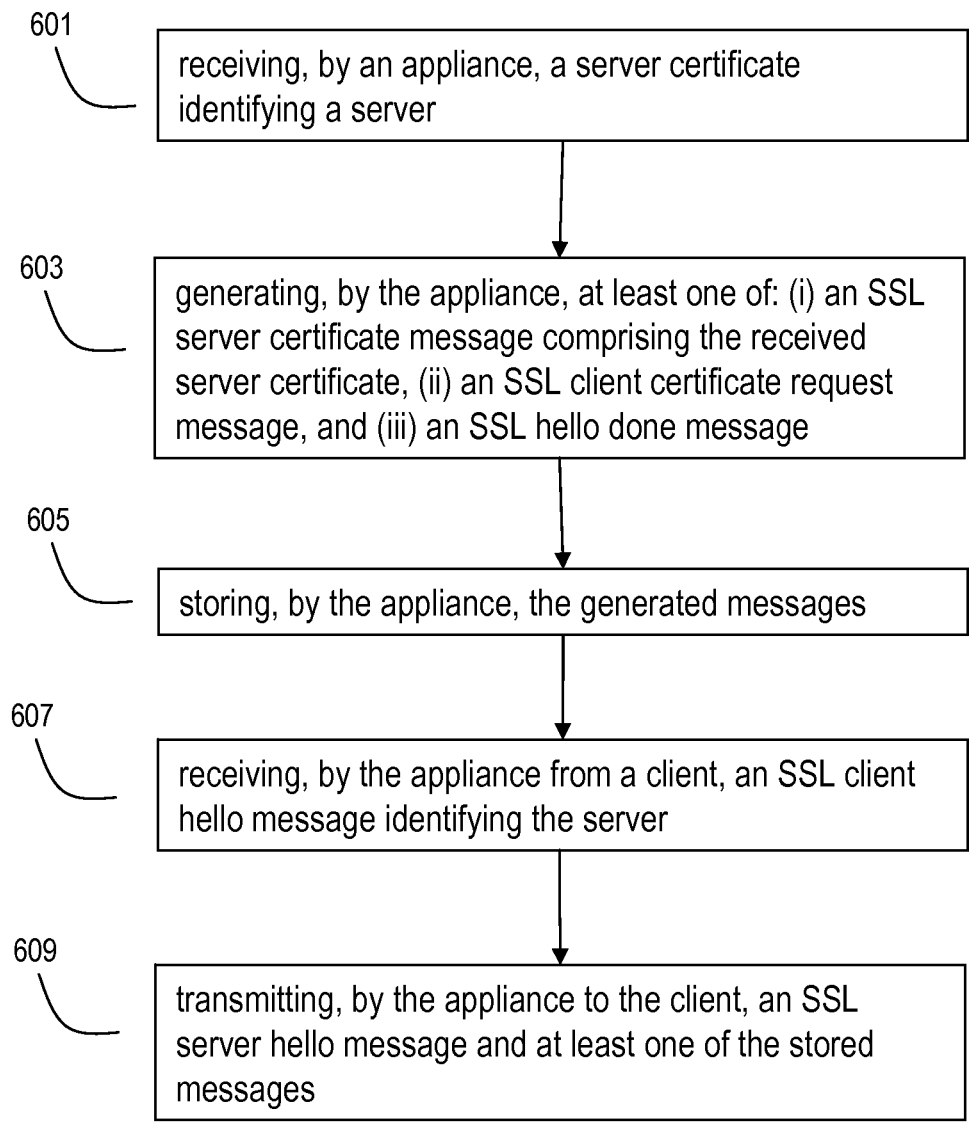
FIG. 6 is a method for enabling efficient SSL handshakes through precomputing of handshake messages.

Referring now to FIG. 6, a method for enabling efficient SSL handshakes through precomputing of handshake messages is shown. In brief overview, the method comprises: receiving, by an appliance, a server certificate identifying a server (step 601); generating, by the appliance, at least one of: (i) an SSL server certificate message comprising the received server certificate, (ii) an SSL client certificate request message, and (iii) an SSL hello done message (step 603); storing, by the appliance, the generated messages (step 605); receiving, by the appliance from a client, an SSL client hello message identifying the server (step 607); and transmitting, by the appliance to the client, an SSL server hello message and at least one of the stored messages (step 609).

Still referring to FIG. 6, now in greater detail, a method for enabling efficient SSL handshakes through precomputing of handshake messages comprises receiving, by an appliance, a server certificate identifying a server (step 601). The server certificate may comprise any type of certificate used to authenticate a computing device, including without limitation an X509v3 certificate. The server certificate may correspond to any computing device capable of communicating with the appliance 200, including a server 106, a second appliance 200, or a client 102.

The appliance 200 may receive the server certificate via any means. In one embodiment, the server certificate may be transferred to the appliance during configuration of the appliance. During configuration, the appliance may receive instructions from an administrator associating a given server certificate with a given network address. In one embodiment, an appliance may be configured with server certificates for each of a plurality of servers to which the appliance provides access. In another embodiment, upon startup of the appliance, the appliance may request server certificates from servers 106 connected to the appliance 200 via a local area network. The appliance may then receive, verify, and store the server certificates.

After receiving, a server certificate identifying a server (step 601); the appliance may generate, at least one of: (i) an SSL server certificate message comprising the received server certificate, (ii) an SSL client certificate request message, and (iii) an SSL hello done message (step 603). In one embodiment, the appliance may generate the messages prior to receiving an SSL client hello requesting an SSL connection with the server identified by the server certificate. In another embodiment, the appliance may generate the messages in response to a single SSL client hello request, and then store the messages for responding to future request. The messages generated may be generated prior to the initiation of an SSL handshake since they do not depend on either random factors contained in previous handshake message or information corresponding to the client requesting the connection. The messages may be generated in any way, and be generated according to any of the SSL and TSL protocols described herein.

In other embodiments, any other SSL handshake messages which do not depend on the identity of the other party or previously transmitted handshake message be generated prior to an SSL handshake and stored. For example, if an appliance is functioning as an SSL client, the appliance may generate a client certificate message corresponding to a received certificate prior to initiating an SSL handshake.

After generating the messages (step 603); the appliance may store the generated messages (step 605). The generated messages may be stored in any form, in any data structure, and in any memory element. In one embodiment, the generated messages may be stored in a data structure corresponding to the server identified by the server certificate. In another embodiment, the generated messages may be stored in a data structure which allows the generated messages to efficiently be retrieved and transmitted to a client.

After storing the generated messages (step 605); the appliance may receive, from a client, an SSL client hello message identifying the server (step 607). The appliance may determine that the client hello identifies the server by any means, including by consulting a table or list of servers for which the appliances has previously generated handshake messages, or by consulting a data structure corresponding to the identified server to determine whether handshake messages have previously been generated.

After receiving, from a client, an SSL client hello message identifying the server (step 607); the appliance may transmit, to the client, an SSL server hello message and at least one of the stored messages (step 609). These messages may be transmitted according to any of the SSL and TSL protocols described herein.

In one embodiment, two or more of the stored messages may be transmitted in a single transport layer packet. In another embodiment, two or more of the stored messages may be transmitted in a single network layer packet. In yet another embodiment, the appliance may transmit in a single transport layer or network layer packet (i) a previously stored SSL server certificate message comprising the received server certificate, (ii) an SSL client certificate request message, and (iii) an SSL hello done message. In other embodiments, one or more of the stored messages may be transmitted in a single transport layer packet with the server hello message.

As an illustrative example, during configuration of an appliance, an administrator may transfer a plurality of server certificates to the appliance, each server certificate corresponding to a server to which the appliance provides access. The appliance may then, during either configuration or initial startup, generate for each received certificate (i) an SSL server certificate message comprising the received server certificate, (ii) an SSL client certificate request message, and (iii) an SSL hello done message for each server certificate. The appliance may then receive an SSL client hello message identifying one of the server to which the appliance provides access. Upon receiving the message, the appliance may generate and transmit an SSL server hello message on behalf of the server. The appliance may then retrieve the three stored messages corresponding to the identified server's server certificate, and transmit them to the client in a single transport layer packet. The appliance may then perform any additional steps required to complete the SSL handshake.

In some embodiments, the method of precomputing SSL handshake messages may be combined with the above method of buffering SSL handshake messages to provide more efficiency gains. The tables below provide illustrative examples of how the methods may be combined in a number of SSL handshake scenarios, utilizing a dedicated cryptographic processing card.

EXAMPLE 1

Full SSL Handshake, Appliance Acting as SSL Server

| Message | Appliance Actions |
| --- | --- |
| Client Hello → | Buffer the Client-Hello message. |
| ←Server Hello | Form the Server-Hello message and send the message out. Store the 32 byte random part of the Server-Hello and other information in SSL session data structure. |
| ← Server Certificate | Retrieve the previously generated Server Certificate message from storage. Send the message out. |
| ← Server Hello Done | Retrieve the previously generated Server Hello Done message from storage. Send the message out. |
| Client Key Exchange → | Buffer the Client-Key-Exchange message. |
| Client Change Cipher Specs → | No buffering for this message. This message is not part of the handshake record. |
| Client Finish → | Send the start address and lengths of the buffered messages and generated messages to dedicated cryptographic processing card for:<br>1. Decryption of the Client-Key-Exchange message.<br>2. Creation of master-secret and session keys from pre-master secret.<br>3. Computation of message digest for SSL handshake, and/or decryption of client finish message.<br>4. Creation of Server Finish message. |
| ← Server Change Cipher Specs | Generate message and send out. |
| ← Server Finish | Retrieve the Server-Finish message from the card and send out. |

EXAMPLE 2

Session Resume Handshake, Appliance Acting as SSL Server

| Message | Appliance Actions |
| --- | --- |
| Client Hello → | Buffer the Client-Hello message. |
| ←Server Hello | Form the Server-Hello message and send the message out. Store the 32 byte random part of the Server-Hello and other information in SSL session data structure. |
| ← Server Change Cipher Specs | Generate message and send out. No buffering for this message. Non-handshake record. |
| ← Server Finish | Call card function to:<br>1. Create key-block.<br>2. Create Server Finish message.<br>3. Computation of message digest for SSL handshake<br>Send the card-generated Server-Finish message out. |
| Client Change Cipher Specs → | No buffering for this message. Non-handshake record. |
| Client Finish → | Verify predicted Client-Finish (RC4), Or Call card function to decrypt the Client-Finish (DES/3DES, AES) and verify the Finish message. |

EXAMPLE 3

SSL Handshake Using Ephemeral RSA Keys, Appliance Acting as SSL Server

| Message | Appliance Action |
|---|---|
| Client Hello → | Buffer the Client-Hello message. |
| ←Server Hello | Form the Server-Hello message and send the message out. Store the 32 byte random part of the Server-Hello and other information in SSL session data structure. |
| ← Server Certificate | Retrieve the previously generated Server Certificate message from storage. Send the message out. |
| ← Server Key Exchange | Form the Server Key Exchange and send the message out.<br>Use card function to offload RSA_sign operation. |
| ← Server Hello Done | Retrieve the previously generated Server Hello Done message from storage. Send the message out. |
| Client Key Exchange → | Buffer the Client-Key-Exchange message. |
| Client Change Cipher Specs → | No buffering for this message. Non-handshake record. |
| Client Finish → | Send the start address and lengths of the buffered messages to card for:<br>1. Decryption of the Client-Key-Exchange mesage.<br>2. Creation of master-secret and session keys from pre-master secret.<br>3. Computation of message digest for SSL handshake, and/or decryption of client finish message.<br>4. Creation of Server Finish message. |
| ← Server Change Cipher Specs | Generate message and send out. No buffering for this message. Non-handshake record. |
| ← Server Finish | Send the card generated Server-Finish message out. |

EXAMPLE 4

SSL Handshake Including Client Authentication, Appliance Acting as SSL Server [35]

| Message | Appliance Action |
|---|---|
| Client Hello → | Buffer the Client-Hello message. |
| ←Server Hello | Form the Server-Hello message and send the message out. Store the 32 byte random part of the Server-Hello and other information in SSL session data structure. |
| ← Server Certificate | Retrieve the previously generated Server Certificate message from storage. Send the message out. |
| ← Server Certificate Request | Retrieve the previously generated Client Certificate Request message from storage. Send the message out. |
| ← Server Hello Done | Retrieve the previously generated Server Hello Done message from storage. Send the message out. |
| Client Certificate → | Buffer the Client Certificate message. |
| Client Key Exchange → | Buffer the Client-Key-Exchange message. |
| Client Certificate Verify → | Buffer the Client Certificate Verify message. |
| Client Change Cipher Specs → | No buffering for this message. Non-handshake record. |
| Client Finish → | Send the start address and lengths of the buffered messages to card for:<br>1. Decrypt Client Certificate verify message and verify it.<br>2. Decryption of the Client-Key-Exchange message.<br>3. Creation of master-secret and session keys from pre-master secret.<br>4. Computation of message digest for SSL handshake, and/or decryption of client finish message.<br>5. Creation of Server Finish message. |
| ← Server Change Cipher Specs | Generate message and send out. No buffering for this message. Non-handshake record. |
| ← Server Finish | Send the card generated Server-Finish message out. |

EXAMPLE 5

Full SSL Handshake, Appliance Acting as SSL Client

| Message | Appliance Actions |
| --- | --- |
| Client Hello → | Form the Client-Hello message and send the message out. Store the 32 byte random part of the Client-Hello and other information in SSL session data structur |
| ←Server Hello | Buffer the Server Hello message. |
| ← Server Certificate | Buffer the Server Certificate message. |
| ← Server Hello Done | Buffer the Server Hello Done message. |
| Client Key Exchange → | Form the Client-Key-Exchange message Call card function to encrypt the pre-master secret with server's public-key. RSA_private_encrypt. Send the message out. |
| Client Change Cipher Specs → | Send this message out. No buffering. Non-handshake record. |
| Client Finish → | Send the start address and lengths of the buffered messages to card for: 1. Creation of master-secret and session keys from pre-master secret. 2. Creation of Client Finish message. 3. Computation of message digest for SSL handshake messages |
| ← Server Change Cipher Specs | No buffering for this message. Non-handshake record. |
| ← Server Finish | Verify the received message with the computed message digest, or Call card function to decrypt the received finish message and compare with computed message digest. |

Figure 7:
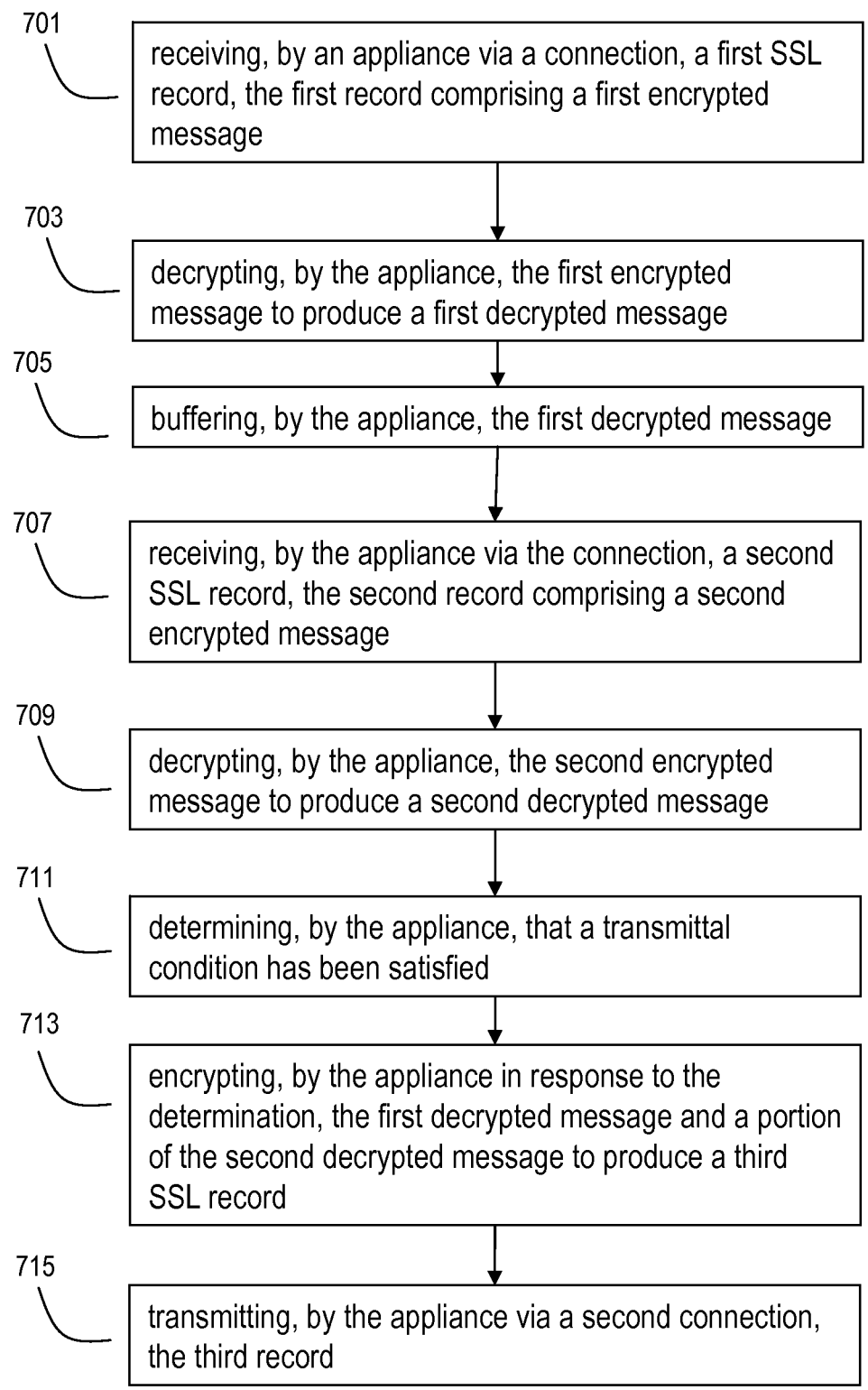
FIG. 7 is a flow diagram of a method for using a network appliance to efficiently buffer and encrypt data for transmission The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

Referring now to FIG. 7, a flow diagram of a method for using a network appliance to efficiently buffer and encrypt data for transmission is shown. In brief overview, the method comprises: receiving, by an appliance via a connection, a first SSL record, the first record comprising a first encrypted message (step 701); decrypting, by the appliance, the first encrypted message to produce a first decrypted message (step 703); buffering, by the appliance, the first decrypted message (step 705); receiving, by the appliance via the connection, a second SSL record, the second record comprising a second encrypted message (step 707); decrypting, by the appliance, the second encrypted message to produce a second decrypted message (step 709); determining, by the appliance, that a transmittal condition has been satisfied (step 711); encrypting, by the appliance in response to the determination, the first decrypted message and a portion of the second decrypted message to produce a third SSL record (step 713); and transmitting, by the appliance via a second connection, the third record (step 715).

Still referring to FIG. 7, now in greater detail, an appliance receives, via a connection, a first SSL record, the first record comprising a first encrypted message (step 701). The connection may be with any computing device, including a client 102, server 106, or a second appliance 200. The SSL record may comprise any SSL or related protocol, including without limitation SSLv2, SSLv3, TLS 1.0 and TLS 1.1. The first encrypted message may be encrypted using any encryption algorithm.

In some embodiments, the first record may be received in a single transport or network layer packet. In other embodiments, the first record may be received in a plurality of transport or network layer packets.

After receiving, via a connection, a first SSL record (step 701); the appliance may decrypt the first encrypted message to produce a first decrypted message (step 703). In some embodiments, the appliance may utilize a cryptographic processing card to decrypt the message. In other embodiments, the appliance may utilize any of the bulk decryption methods described herein to decrypt the message.

After decrypting the message (step 703), the appliance may buffer the decrypted message (step 705). In some embodiments, the appliance may also process the decrypted message in the course of performing any of the network appliance functions described herein.

The appliance may then receive, via the connection, a second SSL record, the second record comprising a second encrypted message (step 707); and decrypt the second encrypted message to produce a second decrypted message (step 709). These steps may be performed in any manner previously discussed. In some embodiments, these steps may occur in parallel or prior to any of the previous steps. For example, the appliance may receive the second record prior to the completion of decrypting the first message. Or, for example, the appliance may receive the second record immediately after receiving the first record. In some embodiments the appliance may also process the second decrypted message in the course of performing any of the network appliance functions described herein.

After decrypting, the second encrypted message to produce a second decrypted message (step 709); the appliance may determine that a transmittal condition has been satisfied (step 711). A transmittal conditional may comprise any indication that the messages currently buffered should be encrypted and transmitted immediately.

In one embodiment, a transmittal condition may comprise reaching a maximum quantum size. In this embodiment, once a certain number of bytes of decrypted data is ready for transmission, the condition is triggered. A maximum quantum size may be determined with respect to any of the following: (i) a maximum segment size for an outgoing connection, (ii) a maximum input size for a cryptographic processing card, (iii) a maximum buffer size, and (iv) a maximum SSL record size specified by a protocol. For example, an appliance may receive SSL data from a client, destined to a server. The appliance may decrypt and process the SSL data in order to provide various network appliance functions. The appliance may then buffer the decrypted data until the amount of data reaches a threshold corresponding to the maximum input size of a cryptographic processing card. The appliance may then send the data to the card for encryption and then transmit the data to the server.

In another embodiment, a transmittal condition may comprise receiving an end-of-transaction indicator. In one embodiment, the appliance may detect an end-of-transaction indicator for http or https data passing through the appliance. Upon detecting the end-of-transaction indicator, the appliance may send all buffered data corresponding to the transaction for encryption and transmission.

In another embodiment, a transmittal condition may comprise receiving a FIN indicator for a given connection. For example, an appliance may detect a TCP FIN packet on a TCP connection the appliance is routing from a client to a server. Upon detecting the TCP FIN indicator, the appliance may send all buffered data corresponding to the TCP connection for encryption and transmission.

In another embodiment, a transmittal condition may comprise receiving a PUSH indicator for a given connection. For example, an appliance may detect a TCP PUSH packet on a TCP connection the appliance is routing from a client to a server. Upon detecting the TCP PUSH indicator, the appliance may send all buffered data corresponding to the TCP connection for encryption and transmission.

In still another embodiment, a transmittal condition may comprise the expiration of a timer corresponding to one or more buffered messages. For example, an appliance may be configured to encrypt and transmit all buffered data within a maximum of 20 ms after buffering the data. Upon expiration of the timer corresponding to a given buffered message, the appliance may send the buffered data for encryption and transmission After determining that a transmittal condition has been satisfied (step 711); the appliance may, in response to the determination, encrypt the first decrypted message and a portion of the second decrypted message to produce a third SSL record (step 713). In some embodiments, this encryption may be done by a cryptographic processing card. In some embodiments, the appliance may encrypt the messages using the same algorithm used to decrypt the messages. In other embodiments, the appliance may encrypt the messages using a different algorithm than the algorithm used to decrypt the messages. In some embodiments, the third SSL record may comprise the same SSL protocol as the first and second records. In other embodiments, the third SSL record may comprise a different SSL protocol than the first and second SSL records.

After producing a third SSL record (step 713); the appliance may transmit, via a second connection, the third record (step 715). This transmission may be addressed to any computing device including a client, server, or second device. The second connection may comprise any protocol or protocols described herein.

While the invention has been particularly shown and described with reference to specific preferred embodiments, it should be understood by those skilled in the art that various changes in form and detail may be made therein without departing from the spirit and scope of the invention as defined by the appended claims.

We claim:

1. A method for enabling efficient SSL handshakes through pre-computing of handshake messages, the method comprising:
   (a) generating, by a device intermediary to a client and a server, one or more SSL messages for responding to a SSL client hello message identifying the server, the device having a server certificate of the server;
   (b) storing, by the device, the one or more generated SSL messages prior to receiving the SSL client hello message from the client; and
   (c) transmitting, by the device to the client responsive to receiving the SSL client hello message, an SSL server hello message and at least one of the one or more stored messages.

2. The method of claim 1, wherein step (a) comprises receiving, by the device, a server certificate identifying the server.

3. The method of claim 1, wherein step (a) comprises receiving, by the device, a plurality of server certificates, each identifying one of a plurality of servers.

4. The method of claim 1, wherein step (a) comprises generating, by the device, (i) an SSL server certificate message comprising the received server certificate, (ii) an SSL client certificate request message, and (iii) an SSL hello done message.

5. The method of claim 1, wherein step (a) comprises generating, by the device for each of a plurality of received server certificates, (i) an SSL server certificate message comprising the received server certificate, (ii) an SSL client certificate request message, and (iii) an SSL hello done message.

6. The method of claim 1, wherein step (a) comprises generating, by the device prior to receiving the SSL client hello message, at least one of: (i) an SSL server certificate message comprising the received server certificate, (ii) an SSL client certificate request message, and (iii) an SSL hello done message.

7. The method of claim 1, wherein step (a) comprises generating, by the device prior to receiving the SSL client hello message identifying the server, at least one of: (i) an SSL server certificate message comprising the received server certificate, (ii) an SSL client certificate request message, and (iii) an SSL hello done message.

8. The method of claim 1, wherein step (c) comprises transmitting, by the device to the client, an SSL server hello message and at least two of the stored messages.

9. The method of claim 1, wherein step (c) comprises transmitting, by the device to the client, an SSL server hello message and at least two of the stored messages, wherein at least two of the stored messages are transmitted in a single network layer packet.

10. The method of claim 1, wherein step (c) comprises transmitting, by the device to the client, an SSL server hello message and at least two of the stored messages, wherein at least two of the stored messages are transmitted in a single transport layer packet.

11. A system for enabling efficient SSL handshakes through pre-computing of handshake messages, the system comprising:
   a device intermediary to a client and a server which has a server certificate of the server; and
   a packet engine generating one or more of SSL messages for responding to a SSL client hello message identifying the server, and stores the one or more generated SSL messages prior to receiving the SSL client hello message, wherein the device transmits, to the client responsive to receiving the SSL client hello message, an SSL server hello message and at least one of the one or more stored messages.

12. The system of claim 11 wherein the device provides access to the server.

13. The system of claim 11 wherein the device receives a plurality of server certificates each identifying one of a plurality of servers.

14. The system of claim 11 wherein the packet engine generates (i) an SSL server certificate message comprising the received server certificate, (ii) an SSL client certificate request message, and (iii) an SSL hello done message.

15. The system of claim 11 wherein the packet engine generates, for each of a plurality of received server certificates, (i) an SSL server certificate message comprising the received server certificate, (ii) an SSL client certificate request message, and (iii) an SSL hello done message.

16. The system of claim 11 wherein the packet engine generates, prior to receiving the SSL client hello message, at least one of: (i) an SSL server certificate message comprising the received server certificate, (ii) an SSL client certificate request message, and (iii) an SSL hello done message.

17. The system of claim 11 wherein the packet engine generates, prior to receiving the SSL client hello message, (i) an SSL server certificate message comprising the received server certificate, (ii) an SSL client certificate request message, and (iii) an SSL hello done message.

18. The system of claim 11 wherein the packet engine generates, for each of a plurality of received server certificates, prior to receiving the SSL client hello message identifying a corresponding server, at least one of: (i) an SSL server certificate message comprising the received server certificate, (ii) an SSL client certificate request message, and (iii) an SSL hello done message.

19. The system of claim 11 wherein the device transmits, to the client, an SSL server hello message and at least two of the stored messages, wherein the at least two of the stored messages are transmitted in a single transport layer packet.

20. The system of claim 11 wherein the device transmits, to the client, an SSL server hello message and at least two of the stored messages, wherein the at least two of the stored messages are transmitted in a single network layer packet.

* * * * *